April 21, 1925.  1,534,835

L. BOZIE

BREAD RAISER

Filed Feb. 14, 1922

Inventor
L. Bozie
By D. Swift
Attorney

Patented Apr. 21, 1925.

1,534,835

UNITED STATES PATENT OFFICE.

LENA BOZIE, OF HIGHGATE SPRINGS, VERMONT.

BREAD RAISER.

Application filed February 14, 1922. Serial No. 536,574.

*To all whom it may concern:*

Be it known that I, LENA BOZIE, a citizen of the United States, residing at Highgate Springs, in the county of Franklin, State of Vermont, have invented a new and useful Bread Raiser; and I do hereby declare the following to be a full, clear, and exact description of the invention, such as will enable others skilled in the art to which it appertains to make and use the same.

The invention relates to bread raisers and has for its object to provide a device of this character wherein a kneading board is provided, and the device provided with a removable tray having a plurality of chambers therein for the reception of hot water. The hot water forms means whereby bread may be raised and kept warm during rising, thereby obviating the present practice of placing the bread around the stove where it will be maintained warm.

A further object is to provide a bread board and bread raising device comprising an elongated casing, one side of which forms a bread board, said casing having disposed therein a water receiving tray, in which water is received and the heat dissipated therefrom engages the underside of the bread tray. The bread tray, when the device is used as a bread raiser receives the dough.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1:
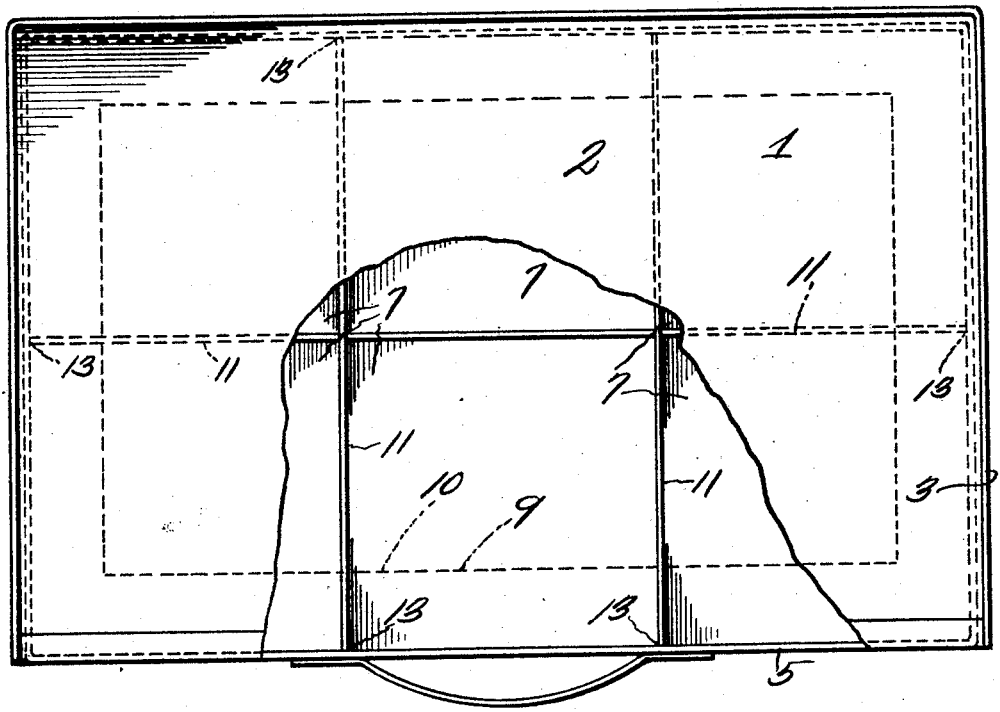
Figure 1 is a top plan view of the combined bread board and raiser.
Figure 2:
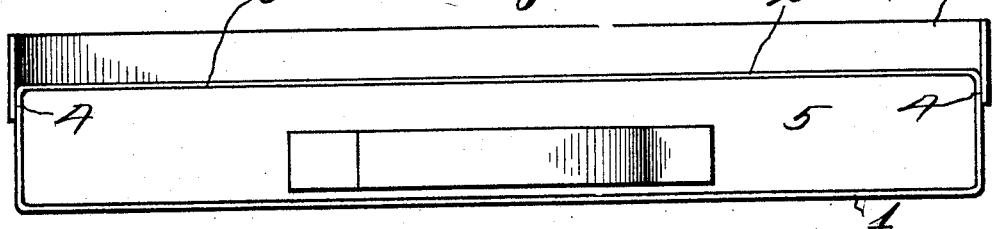
Figure 2 is a front elevation of the device.
Figure 3:
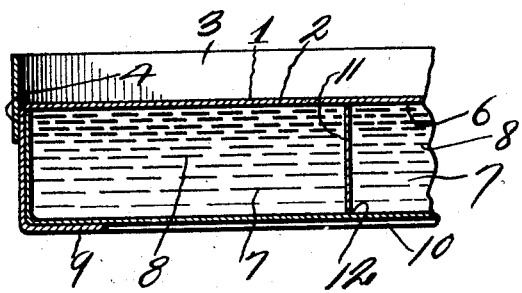
Figure 3 is a vertical sectional view through one side of the device.

Referring to the drawings, the numeral 1 designates a rectangular shaped casing, the upper side 2 of which forms a bread board on which dough may be kneaded, and prepared. Extending around the bread board 2 at its sides and rear end is a flange 3, which flange may be secured to the casing by soldering at 4. The flange 3 forms means for preventing flour and the like from being pushed off the board during the kneading of the dough, and by obviating the use of a flange at its forward side, does not interfere with the arms of the operator during a dough working operation.

It is the practice at the present time to set bread around a stove to keep it warm while it is rising. This practice is inconvenient and the bread is in the way of other operations. To overcome this difficulty, the casing 1 is provided with a removable tray 5, which tray is received within the chamber 6 of the casing and is preferably divided into compartments 7 for the reception of hot water when the tray is removed from the casing 1. When it is desired to raise the bread, the bread is placed on the board 2 over one of the compartments or all the compartments, and the compartments are filled with hot water.. It will be seen that the heat from the water 8 will engage the underside of the bread board 2 and that the bread-board 2 will be heated, and the surrounding air will also be heated in such a manner that the dough on the board 2 will be maintained warm, thereby allowing the same to rise. If only a small batch of dough is being raised, it may be placed over one or two of the compartments in which hot water is placed, the other compartments being left empty. The bottom 9 of the casing 1 is preferably cutaway as at 10, thereby saving material, and at the same time allowing the device if so desired to be placed on a stove and the temperature of the water within the compartments to be raised to the desired degree. Compartments 7 are formed by partitions 11, which may be soldered to the bottom of the pan 5 as at 12, and to the sides thereof at 13.

From the above it will be seen that a combined bread board and bread raiser is provided, which is simple in construction and one wherein a plurality of hot water receiving pockets are provided beneath the bread board, any one of which or all may be used for receiving water, the heat from which is dissipated towards the under side of the bread board.

The invention having been set forth what is claimed as new and useful is:—

A combined dough kneading board and dough raising device comprising a relatively flat rectangular shaped casing, a horizontally disposed flange carried by the lower side of the casing and forming the bottom thereof and an enlarged opening in the bottom, said casing having its inner side open, a hot water receiving pan disposed within the casing and removable through the open side of the casing, said pan being provided with a plurality of partitions, thereby forming a plurality of water receiving chambers, and an upwardly extending U-shaped flange carried by the casing and extending upwardly from the ends and front side of the casing.

In testimony whereof I have signed my name to this specification in the presence of two subscribing witnesses.

LENA BOZIE.

Witnesses:
 RAY S. HITCHCOCK,
 H. J. SUNDERLAND.